(12) United States Patent
Humphrey

(10) Patent No.: US 6,400,771 B1
(45) Date of Patent: Jun. 4, 2002

(54) DRIVER CIRCUIT FOR A HIGH SPEED TRANSCEIVER

(75) Inventor: Guy H. Humphrey, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/119,832

(22) Filed: Jul. 21, 1998

(51) Int. Cl.$^7$ ................................................. H04B 3/00
(52) U.S. Cl. ...................................... 375/257; 375/219
(58) Field of Search .................................. 375/257, 219, 375/220, 354, 377, 295, 316; 455/73; 710/1, 100, 101

(56) References Cited

U.S. PATENT DOCUMENTS

| | | | | |
|---|---|---|---|---|
| 5,469,473 A | * | 11/1995 | McClear et al. | 375/219 |
| 5,548,592 A | * | 8/1996 | Komarek et al. | 370/271 |
| 5,999,017 A | * | 12/1999 | Irwin | 326/73 |

* cited by examiner

Primary Examiner—Stephen Chin
Assistant Examiner—Chieh M. Fan
(74) Attorney, Agent, or Firm—Alexander J. Neudeck

(57) ABSTRACT

The present invention is generally directed to a driver circuit for a high speed transceiver. In accordance with one aspect of the invention, the driver circuit includes a first driver segment disposed to receive a control signal and configured to drive the control signal from a logic zero state to a logic one state and place the driven signal on a first driver segment output. Similarly, the driver circuit includes a second driver segment disposed to receive the control signal and configured to drive the control signal from a logic one state to a logic zero state and place the driven signal on a second driver segment output. In this regard, the control signal is a signal generated internally (i.e., within the chip) to be driven across a bus to another chip. The strength of the control signal must be increased before driving the control signal onto the bus. For this reason, the first driver segment and the second driver segment each include a plurality of drive units that are disposed in a cascaded configuration. As the control signal passes through each successive drive unit, it gains in signal strength. As will be appreciated by persons skilled in the art, this cascaded drive unit configuration provides for an extremely fast overall power build-up of the signals, as opposed to using a single, more powerful drive unit. To balance the timing delay between the two segments, a delay element is serially disposed within the segment have the fewer inversions.

8 Claims, 6 Drawing Sheets

DRIVER CIRCUIT FOR A HIGH SPEED TRANSCEIVER

BACKGROUND OF INVENTION

1. Field of the Invention

The present invention generally relates to high speed circuit transceivers, and more particularly to a driver circuit for a high speed circuit transceiver designed to have extremely fast transition speeds and a substantially constant latency for transitions from a logic zero state to a logic one state, and for transitions from a logic one state to a logic zero state.

2. Discussion of the Related Art

Synchronous data systems have long been known. As is known, a synchronous data system is one in which data transfers occur coincident with a clock or some other strobe signal. In this regard, a driver places data on a bus in a known relation to, for example, a clock signal. In accordance with appropriate system design and defined setup and hold times, the driver places the data on the bus with sufficient time for the data to become valid, before the triggering edge of the clock signal. At the triggering edge (either rising edge or falling edge) of the next clock signal, data placed on the bus is clocked into a receiver.

Typically, the clock or other strobe signal is a global one, that extends throughout a system. In this regard, reference is made to FIG. 1, which shows a block diagram of a portion 10 of a synchronous data system as is known in the prior art. A clock generating component 12 (usually a crystal oscillator) provides a periodic alternating waveform 14, such as a square wave, that provide a synchronizing clock signal for all registered components in the system. The signal is carried on a conductor 16 to various components, and may be passed (through cabling, a motherboard backplane, or otherwise) to other circuit boards in the system.

For purposes of illustration, FIG. 1 shows only a few basic circuit components. These include a CPU 18, such as a microprocessor, and several registers 20, 22, 24. As illustrated, the clock signal 14 is routed to each of these components. When data is to be transferred from the CPU 18 to a register 20, or from a register 20 to the CPU 18, it is transferred in a synchronous manner. For simplicity, chip select circuitry and other control circuitry has been omitted from the drawing, but the existence and operation of such circuitry will be known and appreciated by those skilled in the art. For example, each of the registers 20, 22, and 24 will be uniquely address, as determine by the state of an address bus (not shown). Decoder circuitry, controlled by the address bus, then individually enables or selects the registers 20, 22, and 24, based upon the address specified by the address bus.

By way of example, consider a data transfer from the CPU 18 to the register 20. As illustrated by the small circle at the clock input to the register 20, the register 20 of the illustrated embodiment is active on the negative going edge of the clock signal 14. Thus, the CPU 18 must place the data on the data bus 26 at least some time before the negative going edge of the clock 14. As illustrated in FIG. 2, this is referred to as a setup time. In this regard, the data setup time recognizes that a finite period of time is required for data signals to propagate through components in the CPU before reaching their final state. Therefore, the CPU 18 must begin the output process before the negative going edge of the clock 14. Also, the CPU 18 is required to hold the data for a predetermined period of time after the negative going edge of the clock 14 (known as the hold time). The concepts of setup times and hold times in synchronous data systems are well known and need not be further explained herein.

While synchronous data systems of the type described above provide an effective way of communicating data between circuit components in a synchronized fashion, they suffer a number of shortcomings, as the system clock speeds increase. Specifically, in many data systems presently under design, data transfer rates are 250 mega transfers per second (MT/s), and are fast approaching 500 MT/s. In general, speed is extremely important and the faster the system the better. Conventional global clocked systems are incapable of meeting the requirements of transmitting data from chip to chip at these higher data rates, for a number of reasons. Limitations on clocked data I/O pads, clock skew between chips, and bus length are just a few factors that constrain the maximum speed achievable in a conventional global clocked synchronous data system. Indeed, in conventional systems, bus length was not a significant factor in design. However, in a system demanding a 500 MT/s data transfer rate, exchanges must occur in less than two nanoseconds ($2 \times 10^{-9}$). At these speeds, the delay that may occur along the data path, due in part to bus length, must be a factor for consideration. In fact, the entire manner in which data is communicated must be reconsidered in order to meet the extremely fast data transfer rates desired by present systems.

Accordingly, it is desired to provide a circuit for use in a high data transfer rate system, that effectively addresses and overcomes the shortcomings and concerns of prior art systems.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a driver circuit for a high speed transceiver. In accordance with one aspect of the invention, the driver circuit includes a first driver segment disposed to receive a control signal and configured to drive the control signal from a logic zero state to a logic one state and place the driven signal on a first driver segment output. Similarly, the driver circuit includes a second driver segment disposed to receive the control signal and configured to drive the control signal from a logic one state to a logic zero state and place the driven signal on a second driver segment output. In this regard, the control signal is a signal generated internally (i/e., within the chip) to be driven across a bus to another chip. Being relatively weakly driven within the chip, the strength of the control signal must be increased before driving the control signal onto the bus. For this reason, the first driver segment and the second driver segment each include a plurality of drive units that are disposed in a cascaded configuration. As the control signal passes through each successive drive unit, it gains in signal strength. As will be appreciated by persons skilled in the art, this cascaded drive unit configuration provides for an extremely fast overall power build-up of the signals, as opposed to using a single, more powerful drive unit. Furthermore, the cascaded drive units within the first and second driver segments are configured to have substantially the same delay through each.

In accordance with the preferred embodiment of the present invention, the driver circuit is implemented in a high speed transceiver circuit that is used to provide source synchronous data communications. More specifically, the driver circuit is used in a transceiver circuit component that drives both a data signal and a strobe signal that is used by a corresponding transceiver circuit to synchronize the data reception. In such a circuit configuration, it is desirable that the signals (both data and strobe) be driven from low to high states and from high to low states extremely rapidly. For extremely high speed data transfers, not only should the transitions occur very rapidly, but the transition speeds (and timing) should be consistent among the various data bits and the strobe signals. However, the strobe signal will be delayed slightly (preferably by one-fourth of a cycle), either on the transmitter end or the receiver end in order to allow the data bits sufficient time to set up before being read or latched into the receiver.

Further in accordance with the preferred embodiment, the drive units are inverters that are configured with a pair of coupled field effect transistors—one p-type FET and one n-type FET. Since the same control signal is input to both driver segments, it will be appreciated that one of the driver segments must include an additional inversion. To this end, and in order to generate signals having a desired drive strength at a minimal delay, the first driver segment includes three inverters and the second driver segment includes two inverters. Since it is further desired to maintain a substantially uniform delay between the two driver segments, a non-inverting delay unit is also cascaded within the second driver segment.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
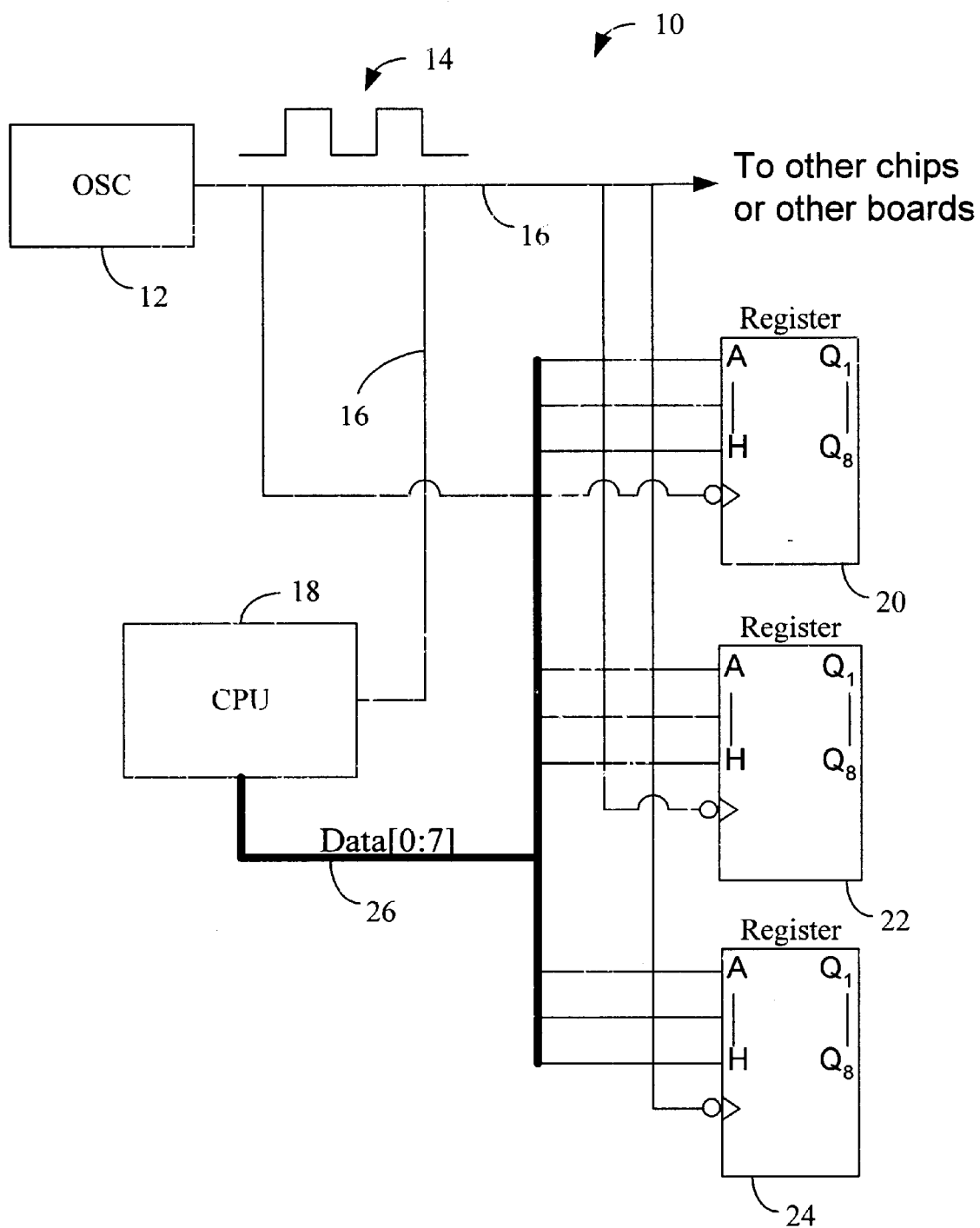
FIG. 1 is a block diagram of a global synchronous data transfer system as is known in the prior art.
Figure 2:
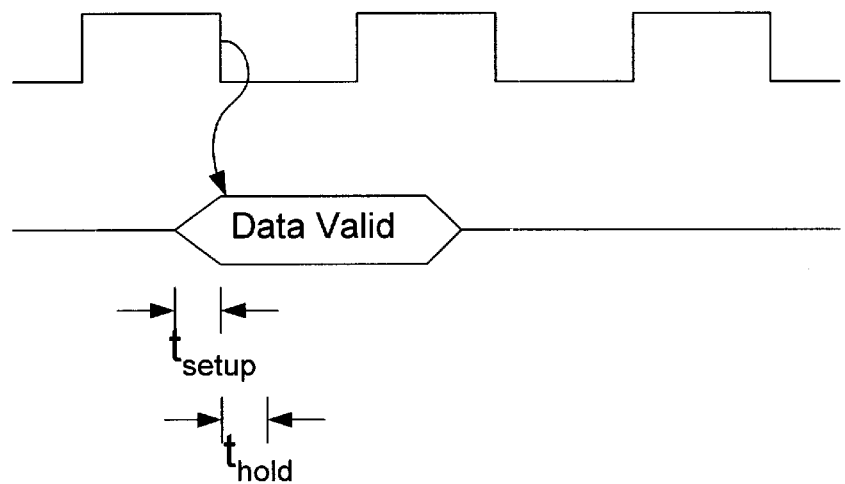
FIG. 2 is a timing diagram illustrating a data transfer of the system of FIG. 1.

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

With data transfer rates exceeding the limits that can be handled by conventional synchronous systems, an alternative manner of data communication must be implemented. A first step towards this high speed data transfer implementation is accomplished through what is called a "source synchronous" data transfer. In a source synchronous system, for example, when a first chip transmits data to a second chip, the first chip not only drives the data on a bus extending between the two chips, but also drives a strobe signal that is closely controlled and timed with the data. Recognizing that the data signals must be given sufficient time to set up before the chip disposed to receive the data may latch or otherwise acquire the data, the first chip driving the signals will preferably be controlled to place the data on the bus at some time prior (i.e., sufficient time to allow data set up) to the transmission of the strobe signal. Upon receiving the strobe signal, the second chip may latch or otherwise clock in the data on the data bus.

It will be appreciated that there are, generally, two types of source synchronous systems. A first type of source synchronous system can be classified as a "multi-load" system. In a multi-load source synchronous system, the first chip, or source chip, drives output signals (both data and strobes) that are routed to a plurality of receiving chips. A second type of source synchronous system is a "single-load" system, wherein the source chip drives signals sent to only a single receive chip. As will be appreciated from a basic understanding of transmission line effects and mismatched termination impedances, on multi-load source synchronous systems, transmission reflections are generally more intense than they are in single-load source synchronous systems. Accordingly, the data transfer rate on multi-load synchronous systems is more limited than in single-load source synchronous systems.

The preferred embodiment of the present invention is directed to a single-load source synchronous data transfer system. In this regard, it is an object of the present invention to achieve extremely fast data transfers. To achieve this object, the preferred embodiment operates to drive signals at extremely high rates. Specifically, both low to high transitions, as well as high to low transitions on data signals, as well as strobe signals, occur very rapidly. In a single-load system, impedances may be matched on the receiving end in a way that will minimize signal reflections that are due to sharp edge transitions.

Figure 3:
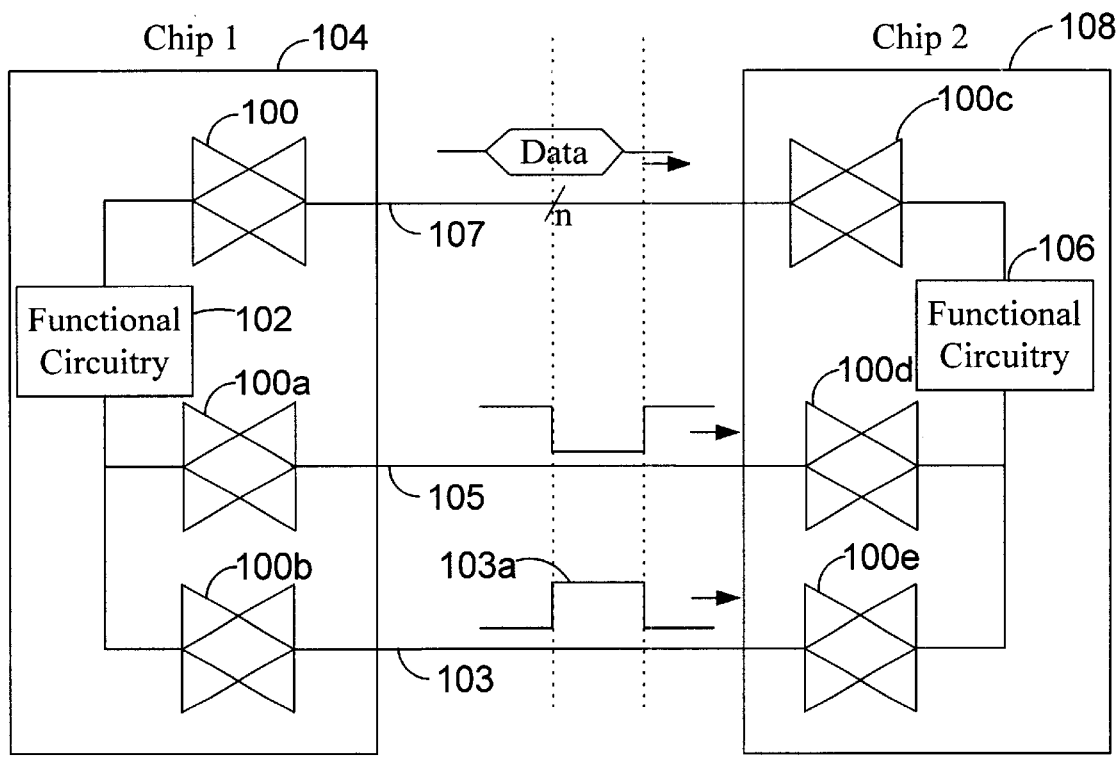
FIG. 3 is a block diagram of a source synchronous data transfer system according to the present invention.

With this general understanding of the present invention, reference is now made to FIG. 3, which is a block diagram illustrating the transfer of data between two chips in a source-synchronous system. As will be described in more detail below, the present invention relates to the driver circuitry of a transceiver circuit 100. As shown in FIG. 3, there are a plurality of transceiver circuits 100 and 100a–100e. In this regard, the same circuitry that is used to drive data signals may also be used to drive strobe signals. Furthermore, a plurality of transceiver circuits are used to drive the data signals (one for each data line).

In accordance with the preferred embodiment of the present invention, a first chip 104 is in communication with a second chip 108. The two chips may physically be located on the same printed circuit board, or may alternatively be disposed on two separate circuit boards, whereby the boards may communicate through cabling, across a motherboard back plane, or in some other fashion. As will be appreciated, each chip 104 and 108 includes functional circuitry 102 and 106 that defines the functional operation of the circuitry on the chip 104. As will be appreciated, the signals generated by the functional circuitry do not possess the signal strength to be driven across an exterior data path to a remote chip. Accordingly, such signals are delivered to driver circuits within the transceiver circuits 100, where the signals are bolstered for communication across the bus. Furthermore, the functionality of the chips 104 and 108 may be various (e.g., the chips may be processors, or other devices), and does not form part of the present invention. Accordingly, no discussion will be presented herein as the specific functionality or operation of the functional circuitry 102 and 106.

In the source-synchronous system of the preferred embodiment, a given chip 104 includes a plurality of data lines 107 and two strobe lines 103 and 105. The strobe lines 103 and 105 operate in concert, but out of phase. That is, one strobe line 103 generates a high-going pulse, while the second strobe line 105 will generate a low-going pulse. The timing and synchronization of the strobe signals in relation to the data signal are controlled by the functional circuitry 102. As previously mentioned, the timing relationship between the signals will be such that the data signal is before the active edge of the strobe signals, so as to satisfy the setup time that is required by the receiving chip 108. FIG. 3 illustrates a data transfer from chip 104 to chip 108. As illustrated, in the preferred embodiment, a rising edge of a strobe signal 103a precedes the data signal(s). While the strobe signal 103a is high, a latch of chip 108 is open to receive the data. The data is then placed on the data bus 107, preferably in the middle of the strobe signal. This allows the data signal plenty of time to set up, and also leaves a margin for error or tolerance variances. The data is then latched on the falling edge of the strobe signal 103.

Figure 4:
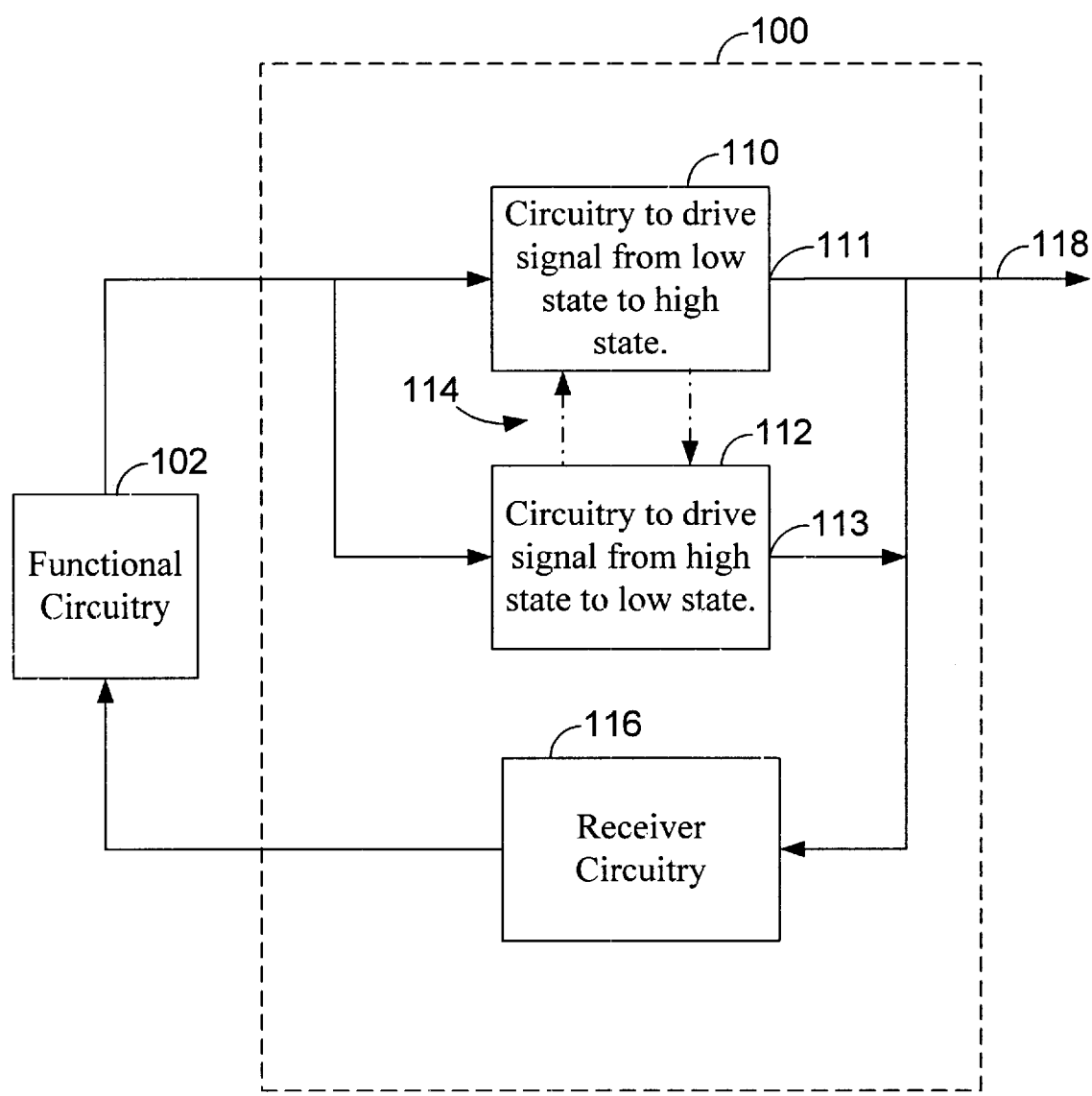
FIG. 4 is a block diagram of driver circuitry of a source synchronous data transfer system according to the present invention.

Having briefly illustrated the environment of the present invention, reference is now made to FIG. 4, which is a block diagram showing the principal components of a transceiver circuit 100 constructed in accordance with the preferred embodiment of the present invention. In this regard, the transceiver circuit 100 includes both driver circuitry 110 and 112 as well as receiver circuitry 116. Since the receiver circuitry 116 does not form part of the present invention, it will not be discussed herein. Instead, reference will be made more particularly to the driver circuitry 110 and 112. In this regard, the driver circuitry is composed of two portions. A first portion 110 is circuitry that is configured to rapidly drive a signal from a low state to a high state (i.e., logic 0 to a logic 1). A second portion 112 is configured to drive a signal from a high state to a low state (e.g., from a logic 1 to a logic 0). Since the outputs 111 and 113 of these two circuit portions are tied together at 118, it is undesirable to have both of these circuit portions driving a high signal at the same time. Accordingly, it is important to ensure that portion 112 has sufficiently driven a high signal to a low state at the output 113 before allowing the output 111 of circuit portion 110 to drive a signal from a low state to a high state.

It should be readily appreciated that one way of ensuring that both circuit portions 10 and 112 are not simultaneously driving a high output is to provide some sort of cross coupling 114 between the two. In essence, the cross coupling may be achieved by relatively straightforward feedback signals provided near the outputs 111 and 113 of the circuit portions 110 and 112. In this regard, the output signal of circuit 111 may be fed back to a point near the output of circuit portions 112. As the output signal 111 is in a high state, that signal could be used to disable the output of circuit portion 112. This approach, unfortunately, adds another delay to the system, and is therefore not the desired approach of the presently preferred embodiment. For this reason, the cross coupling 114 has been illustrated in dash lines. Instead, and as will be further discussed in the discussion that follows, the preferred embodiment of the present invention operates to carefully select circuit components that define the circuit portions 110 and 112 such that they are substantially equally timed.

Figure 6:
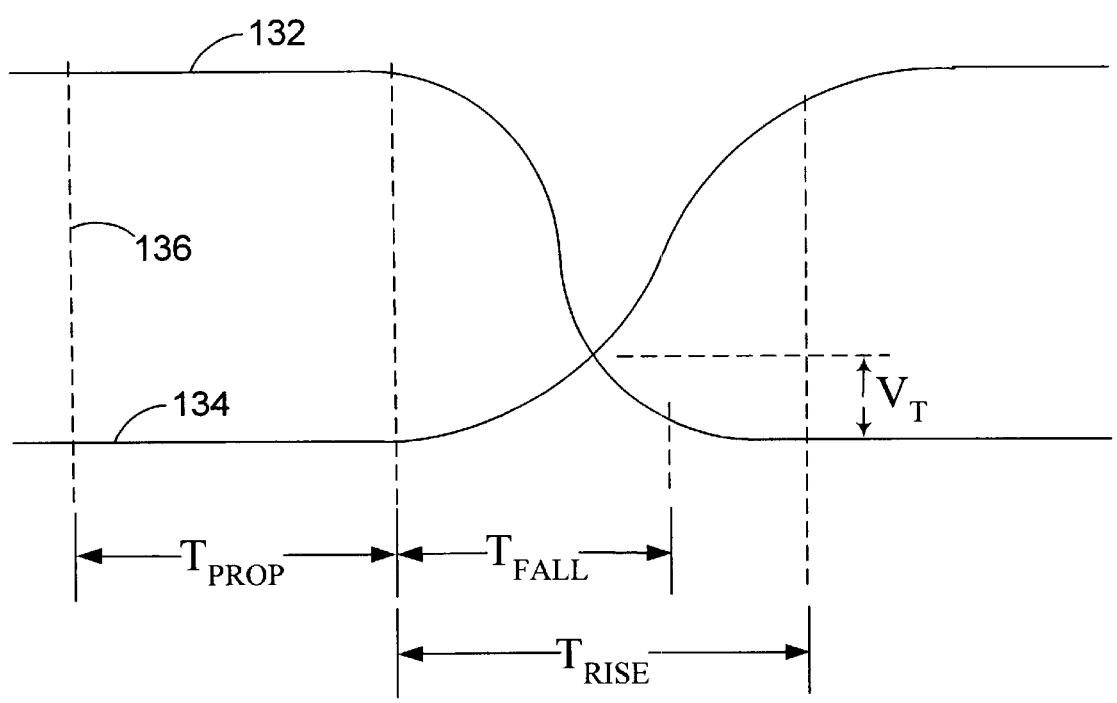
FIG. 6 is a timing diagram illustrating the high-to-low and low-to-high transitions of the driver circuitry of the present invention.

In this regard, reference is made briefly to FIG. 6 which is a timing diagram of the signals on lines 77a and 77b (see FIG. 7), that illustrates the operation of the driver circuit of the preferred embodiment of the present invention. Specifically, signal 132 illustrates a high to low transition on line 77b as is controlled by circuit portion 112, while signal 134 illustrates a low-high transition on line 77a as is controlled by circuit portion 110. As shown in FIG. 4, the input to both portions 110 and 112 are identically driven from a common output of the functional circuitry 102. For purposes of illustration, assume that a transition on this signal takes place at a time illustrated by dash line 136. The driver circuitry of the preferred embodiment of the present invention is uniquely configured such that the propagation delay $T_{prop}$ (i.e., the time duration between the change in the signal on line 76, until the signal on lines 77a and 77b begins to change) is substantially the same between the driver portion 110 and the driver portion 112. Thereafter, the outputs 111 and 113 of circuit portions 110 and 112 are driven from a low to high state and high to low state, respectively.

As will be further discussed below, and illustrated in connection with FIG. 7, the circuitry selected to implement the preferred embodiment of the present invention drives the signal on line 77b from a high state to a low state at a faster rate than the circuitry of portion 110 drives the output on line 77a from a low state to a high state. As specifically illustrated in the figure, the signal on line 77b is driven from a high state to a low state in a period denoted as $T_{fall}$, while the signal driven by circuitry 110 on line 77a is driven from a low state to a high state in a period denominated as $T_{rise}$. As illustrated in the drawing, the crossover point of these two signals is selected such that both signals are at or below a threshold voltage $V_T$ (approximately 0.6 volts in the preferred embodiment), such that both are not driving a high signal simultaneously, which group would create an undesired current spike in the system.

Figure 5:
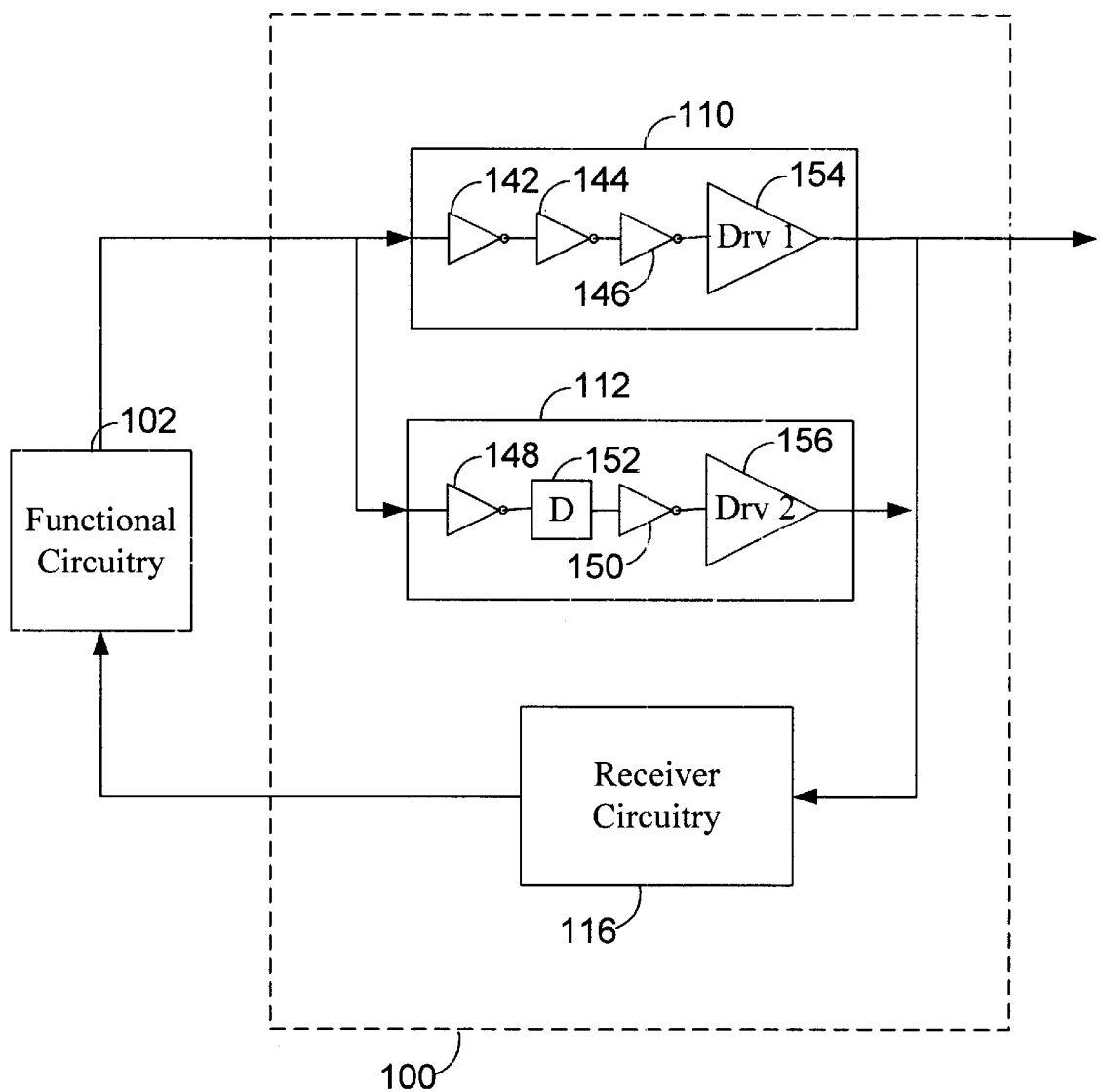
FIG. 5 is a more detailed block diagram of driver circuitry of a source synchronous data transfer system according to the present invention.

To more particularly describe the preferred embodiment of the present invention, reference is now made to FIG. 5, which is a block diagram that shows the circuit portions 110 and 112 in more detail. In short, circuit portion 110 comprises three inverters 142, 144, and 146, and an output driver 154. Circuit portion 112 comprises two inverters 148 and 150, and an output driver 156. Since circuit portions 110 and 112 receive the same input signal and drive their outputs in an opposing manner, it will be appreciated that there will be an odd number of inversions between the two. However, a delay element 152 (preferably a transmission gate) is also provided in connection with circuit portion 112. This element is added so that the delay between the various cascade of circuitry of portion 110 is substantially equal to the overall delay that is realized by the signal passing through circuit portion 112. The reason for the cascade configuration of inverters (e.g., 142, 144, and 146) is that this arrangement helps to build up the signal at a faster rate.

More specifically, and as will be appreciated by those skilled in the art, to maintain a relatively low power operation of a semiconductor device, the functional circuitry 102 drives a relatively low power signal. While such low power operation may be accommodated on chip, when driving signals off chip, the power level must be built up. Although this power level may be built up by passing it through a single driver, it will be understood by those skilled in the art that a single driver or amplifier that is physically large enough (in terms of silicon) to drive the signal at the desired level demands more time to build up the signal than is required by passing the signal through several successive amplifier stages. Balancing the various design tradeoffs, the preferred embodiment of the present invention settled on a three inverter configuration for circuit portion 110 and a two inverter configuration (along with a delay element 152) for circuit portion 112.

Figure 7:
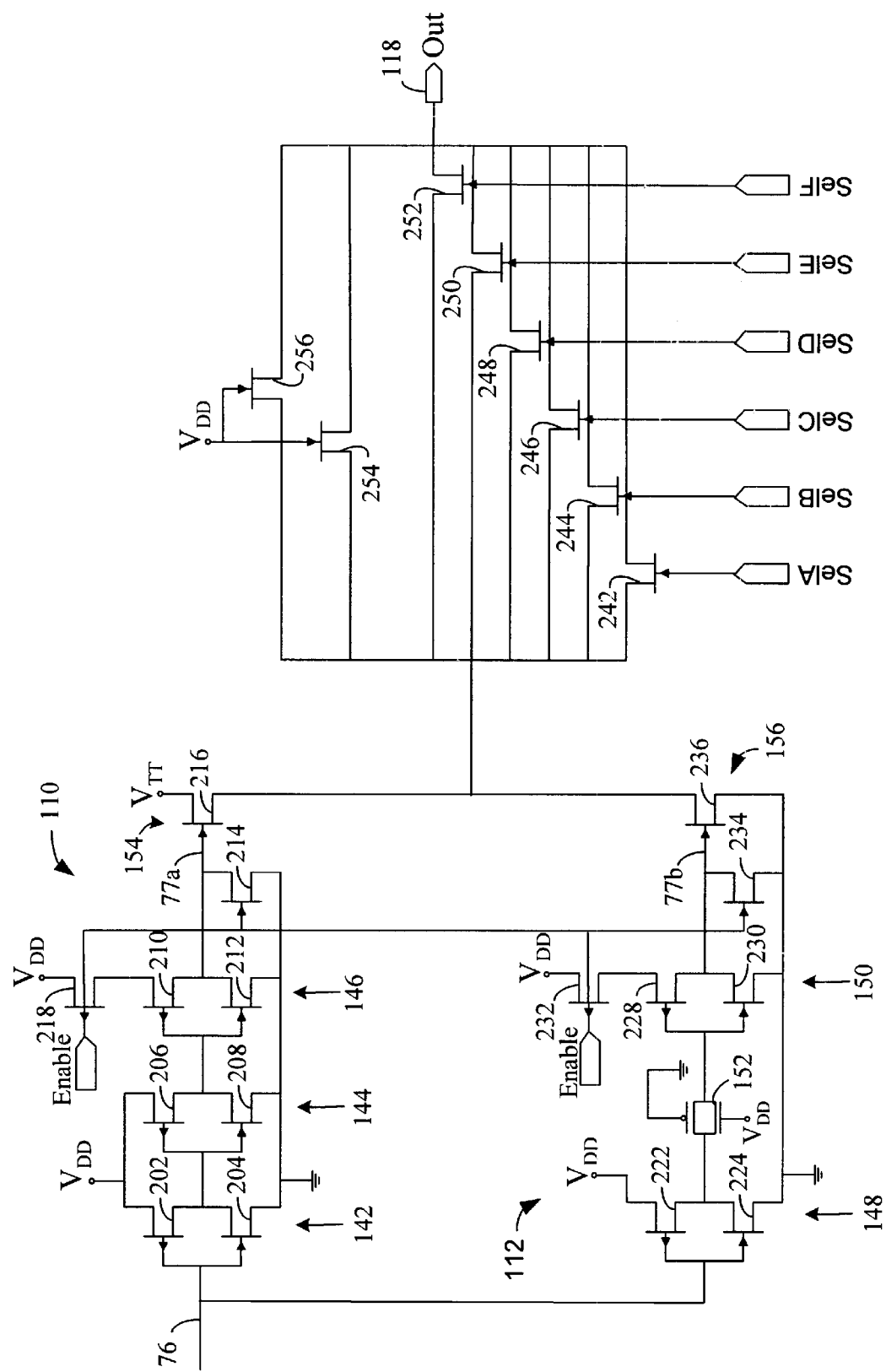
FIG. 7 is a schematic diagram illustrating the actual implementation of a driver circuit constructed in accordance with a preferred embodiment of the present invention.

To more particularly illustrate the driver circuit portions 110 and 112 of the preferred embodiment of the present invention, reference is now made to FIG. 7, which is a schematic diagram illustrating the particular circuit design chosen for implementing the preferred embodiment of the present invention. Specifically, FIG. 7 illustrates the preferred configuration of a plurality of field effect transistors that implement the first portion 110 and second portion 112 of the driver circuitry. The inverters illustrated in FIG. 5 are each comprised of a pair of coupled field effect transistors. For example, inverter 142 is comprised of a P-type FET 202 coupled with an N-type FET 204. Likewise, inverter. 144 comprises field effect transistors 206 and 208, while inverter 146 is implemented with field effect transistors 210 and 212. The driver 154 is implemented by field effect transistor 216.

In similar fashion, inverter 148 is comprised of field effect transistors 222 and 224, while inverter 150 is comprised of field effect transistors 228 and 230. The driver 156 is implemented by transistor 236. Also illustrated as comprising part of the first and second circuit portions are transistors 218, 214, 232, and 234. Although not described above, but as will be appreciated by those skilled in the art, a separate enable line may be directed to the driver circuit and controlled by the functional circuitry 102, previously mentioned. The transistors 218, 214, 232, and 234 are each coupled to this enable signal that may be used to enable or disable the operation of the driver circuit of the present invention. As also illustrated, the circuitry is powered by signals VDD and VTT. As will be appreciated by those skilled in the art, VDD is approximately equal to 3.3 volts, while VTT is approximately equal to 1.5 volts.

As will be appreciated, the speed and power of a given transistor is proportional to the physical size of the transistor within the semiconductor die. As will be appreciated by those skilled in the art, the size of a given transistor can be defined by its width and its length within the die. Accordingly, Table 1 is provided below which specifies the physical size (as drawn) of the various transistors illustrated in FIG. 7, in accordance with the preferred embodiment of the present invention. It should be appreciated, however, that the invention is not limited to the values set forth in the table, but that the table is provided merely to fully disclose the preferred embodiment of the present invention.

TABLE I

| Reference Numeral | Length (microns) | Width (microns) |
| --- | --- | --- |
| 202 | .4 | 15.8 |
| 204 | .4 | 11 |
| 206 | .4 | 18.5 |
| 208 | .4 | 22 |
| 210 | .4 | 66 |

TABLE I-continued

| Reference Numeral | Length (microns) | Width (microns) |
| --- | --- | --- |
| 212 | .4 | 84 |
| 214 | .4 | 84 |
| 216 | .6 | 30 (×12) |
| 218 | .4 | 66 |
| 222 | .4 | 24 |
| 224 | .4 | 7.5 |
| 228 | .4 | 65 |
| 230 | .4 | 70 |
| 232 | .4 | 65 |
| 234 | .4 | 70 |
| 236 | .6 | 36 (×4) |
| 242 | .6 | 8.5 |
| 244 | .6 | 17 |
| 246 | .6 | 34 |
| 248 | .6 | 34 (×2) |
| 250 | .6 | 34 (×4) |
| 252 | .6 | 34 (×8) |
| 254 | .6 | 34 |
| 256 | .6 | 34 |

In Table 1, denoted by reference numerals 216 and 236 have a (×12) and a (×4) nomenclature adjacent the size denominations. These nomenclatures are provided to indicate a parallel grouping of FETs. Specifically, there are twelve parallel FETs 216 that comprise driver 154, and 4 FETs 236 that comprise driver 156. It will be appreciated that the capacitance of driver 154 is much greater than the capacitance of driver 156. In this regard, the ratio of capacitances (which are proportional to area) between driver 156 (12*30/4*36=360/144), which is approximately 2.5:1 The larger input capacitance of driver 154 will cause the low to high transition of driver 154 to take a longer period of time than the high to low transition of driver 156, if being driven by the same size inverter. The three inverter stages were chosen in order to effectively (and quickly) build up strength to drive the large capacitance.

The output work of FETs 242, 244, 246, 248, 250, and 252 are used to vary the effective impedance between the driver circuit and the output of the chip. Select lines SelA, SelC, SelD, SelE, and SelF may be controlled to switch on and off the respective transistors, and thereby controllably alter the impedance. This may be done to actively minimize reflections that may otherwise occur on the line 118, due to signal transistions.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A driver circuit for a high speed transceiver comprising:

a first driver segment disposed to receive a control signal and configured to drive the control signal from a logic zero state to a logic one state and place a first driven signal on a first driver segment output, the first driver segment comprising a first plurality of cascaded drive units;

a second driver segment disposed to receive the control signal and configured to drive the control signal from a logic one state to a logic zero state and place a second driven signal on a second driver segment output, the second driver segment comprising a second plurality of drive units;

the first driver segment output and the second driver segment output being electrically connected; and the first plurality of cascaded drive units and the second plurality of drive units being designed and configured such that a signal delay through each is substantially the same.

2. The circuit as defined in claim 1, wherein the drive units are inverters.

3. The circuit as defined in claim 2, wherein the first driver segment includes three inverters.

4. The circuit as defined in claim 3, wherein the second driver segment includes two inverters.

5. The circuit as defined in claim 4, wherein the second driver segment further includes a transmission gate, configured to substantially match the delay of an inverter.

6. The circuit as defined in claim 1, wherein the driver circuit is used in a source synchronous signal driving circuit.

7. The circuit as defined in claim 2, wherein the inverters comprise a two transistor configuration having a p-type FET coupled to a n-type.

8. A driver circuit for a high speed transceiver comprising:

a first driver segment disposed to receive a control signal and configured and dedicated to drive the control signal from a logic zero state to a logic one state and place a first driven signal on a first driver segment output, the first driver segment comprising a first plurality of cascaded drive units;

a second driver segment disposed to receive the control signal and configured and dedicated to drive the control signal from a logic one state to a logic zero state and place a second driven signal on a second driver segment output, the second driver segment comprising a second plurality of drive units;

the first driver segment output and the second driver segment output being directly electrically connected; and the first plurality of cascaded drive units and the second plurality of drive units being designed and configured such that a signal delay through each is substantially the same.

* * * * *